United States Patent [19]
Hansen

[11] 3,800,924
[45] Apr. 2, 1974

[54] CONTROL LEVER TO ACTUATE REMOTE SHIFT LEVER

[75] Inventor: Kenneth N. Hansen, Waukesha, Wis.

[73] Assignee: Allis-Chalmers Corp., Milwaukee, Wis.

[22] Filed: Dec. 29, 1972

[21] Appl. No.: 319,350

[52] U.S. Cl. .................. 192/4 A, 74/473 R, 74/477
[51] Int. Cl. ......................... G05g 9/16, F16d 67/00
[58] Field of Search ............. 74/473, 475, 476, 477; 192/4 A

[56] References Cited
UNITED STATES PATENTS
| | | | |
|---|---|---|---|
| 2,694,943 | 11/1954 | Brumbaugh | 74/473 |
| 2,917,941 | 12/1959 | Wittren | 74/475 X |
| 3,465,612 | 9/1969 | Letwin et al. | 74/473 R |

Primary Examiner—Allan D. Herrmann
Attorney, Agent, or Firm—Arthur L. Nelson et al.

[57] ABSTRACT

A control lever to operate the remote shift lever through a shifting mechanism. With the vehicle transmission centrally located immediately below the platform on a vehicle, the shift lever is positioned on the transmission housing for selective positioning of the shift lever in park or one of the plurality of shift ranges. A shifting mechanism including a control lever in the control panel on the side of the platform is provided with a lateral shift selector mechanism to selectively position the shift lever in its proper transverse position to selectively engage a shift rail in the transmission. The control lever operates through a shift linkage connected between the control lever and the shift lever responsive to pivotal movement of the control lever to reciprocate the selected shift rail to thereby shift the transmission to park or one of the plurality of shift ranges in the transmission.

10 Claims, 8 Drawing Figures

CONTROL LEVER TO ACTUATE REMOTE SHIFT LEVER

This invention relates to shifting mechanism and more particularly to a control lever positioned at the operator's station of the vehicle having a shift mechanism extending to the remote shift lever on the transmission for shifting the vehicle transmission.

Vehicles having a front end engine and a power train including a transmission for driving the rear wheels generally have a transmission located in the approximate area under the operator station of the vehicle. While using a shift lever mounted directly on the transmission housing is acceptable for some circumstances there are times that it is well to have the control for the shift lever located to the side of the operator station and avoid the inconvenience of having a shift lever in the middle of the platform. The tractor having an operator station and seat in the middle of the vehicle and a large roomy platform provides more freedom for the operator to move around. It also improves the appearance of the operator station to have the control lever positioned in a control console on the side of the operator station. This can be done by the use of a control lever in a control panel having a shifting mechanism extending from the control lever to the centrally positioned shift lever on the transmission.

Accordingly this invention provides such a device with the control lever for shifting conveniently positioned on the side of the operator station with a roomy area at the operator station.

It is an object of this invention to provide a control lever and mechanism for shifting a remotely positioned vehicle transmission.

It is another object of this invention to provide a vehicle shift mechanism having a control lever at the operator station and a linkage to shift a remote shift lever on the vehicle transmission.

It is a further object of this invention to provide a control panel having a control lever at the operator station with a linkage connecting the control lever to a remote shift lever on the transmission.

The objects of this invention are accomplished by providing a platform and seat on the vehicle to define the operator station. Positioned adjacent the operator station is a control panel for controlling the shifting of the vehicle transmission. The vehicle transmission is centrally located immediately below the platform on the vehicle. A shift lever is positioned on the transmission housing for selectively positioning the shift lever in park or one of the plurality of shift ranges. A shifting mechanism connects the control lever in the control panel with the shift lever to selectively position the shift lever in its proper transverse position to selectively engage a shift rail in the transmission. A second movement of the control lever operates through the shifting mechanism to reciprocate the selected shift rail and thereby shift the transmission. Accordingly the control lever through the shifting mechanism transmits a longitudinal and a transverse movement to the shift lever to selectively shift the transmission at the desire of the operator.

Referring to the drawings the preferred embodiment is illustrated.

Figures 1, 2:
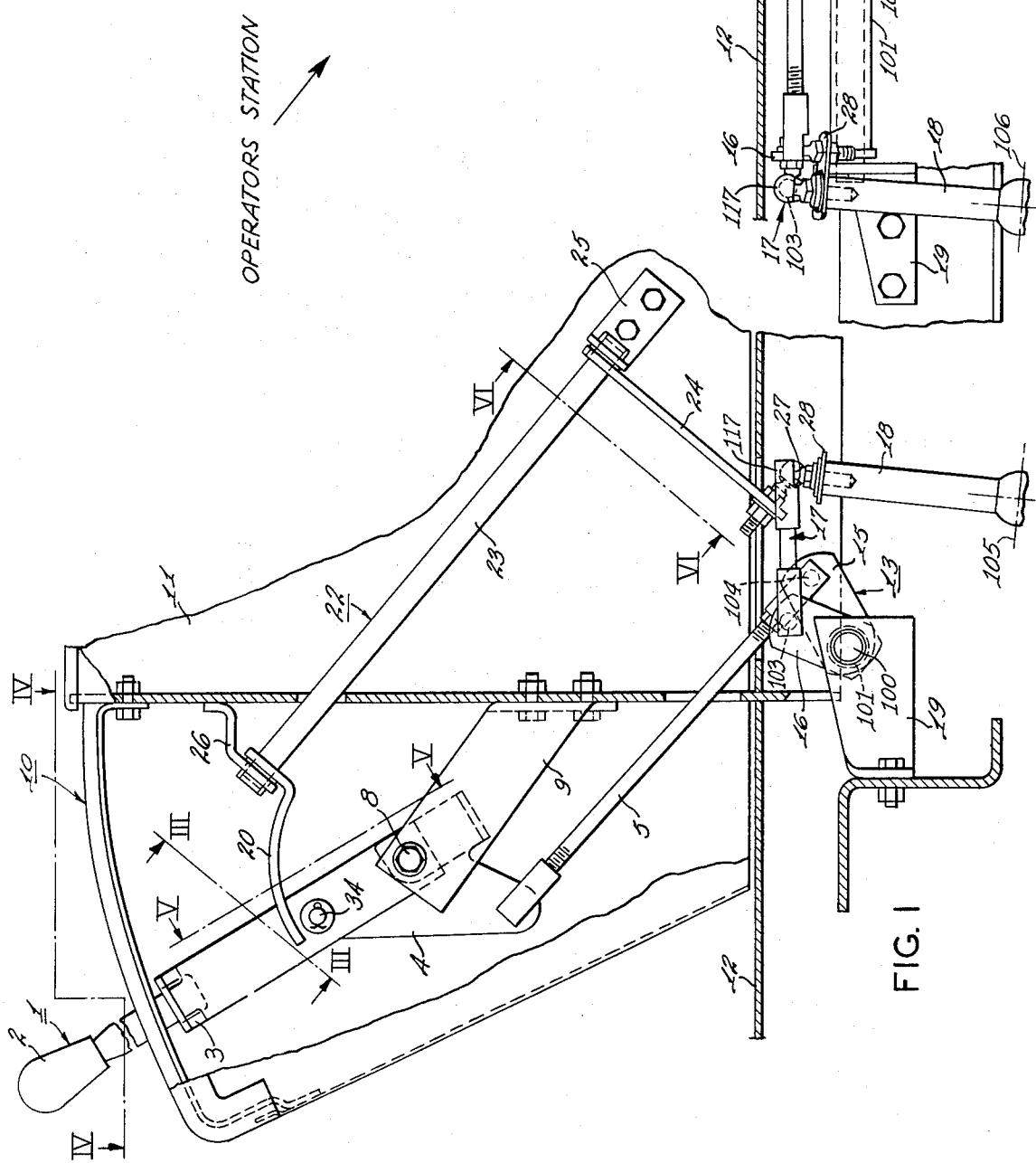
FIG. 1 illustrates a cross section view through the control panel showing the control lever, the shifting mechanism and the shift lever.
FIG. 2 is a cross section view showing the mechanism of FIG. 1 at right angles.

Referring to the drawings, FIG. 1 illustrates a side view of the shifting device. The control lever 1 includes the handle 2 and the support portion 3 which operates as a bell crank in response to movement of the handle 2. The support portion 3 carries arm 4 which is pivotally connected to the pushrod 5. The support portion 3 is pivotally mounted on the bushings 6 and 7 which are rotatably mounted on the bolt 8 carried on the bracket 9 and the side of the control panel 10. Bracket 9 is fastened to the mounting 11 which also carries the control panel 10.

The mounting 11 is supported on the vehicle chassis. The control console 10 is supported immediately above the platform 12. The link 5 extends rearwardly through the mounting 11 and platform 12 to connect to arm 15 of bell crank 13. Accordingly, the control lever 1 pivots about a transverse axis as it is moved fore and aft to operate bell crank 13.

The arm 16 of bell crank 13 is connected by the pivotal connection 103 to the link 17 and by pivotal connection 117 to shift lever 18. The shift lever 18 is supported in the ball and socket joint of the transmission housing for pivoting about axes 105 and 106.

The arms 15 and 16 of bell crank 13 are integral with sleeve 101 which rotates on shaft 100 forming a bearing. Shaft 100 is supported on the bracket 19 as well as the bracket 120. Pivotal movement of the control lever 1 in the fore and aft direction pivots the bell crank 13 about a parallel axis and reciprocates the pushrod 17 longitudinally of the vehicle which in turn moves the shift rail of the vehicle transmission reciprocally to shift the vehicle transmission.

The control lever 1 is also provided with a clearance on the bushing 7 which permits the lever handle 2 to move transversely and pivot on the bushing 7. This movement causes the arm 20 to be cammed on the surface 21 of the handle 2 which in turn rotates the lateral control mechanism 22. The lateral control mechanism includes the shaft 23 and the actuator arm 24 which pivot on the brackets 25 and 26 which in turn are connected to the mounting 11.

Rotation of a lateral control mechanism 22 causes the actuator arm 24 to move about its pivoting axis and reciprocate the adjustable link 27. The adjustable link 27 is connected to the arm 28 which in turn is mounted on the shift lever 18. Accordingly, the shift lever 18 is moved transversely by the transverse control mechanism 22 when the control lever handle 2 is moved transversely. In this manner the shift lever 18 selectively engages one of a plurality of shift rails before the transmission is shifted.

Figure 5:
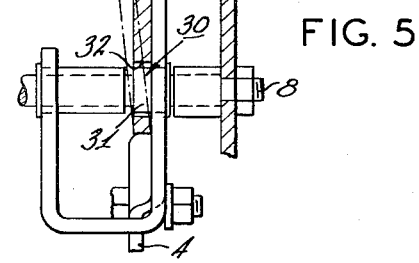
FIG. 5 is a cross section view taken on line V—V of FIG. 1.
Figure 6:
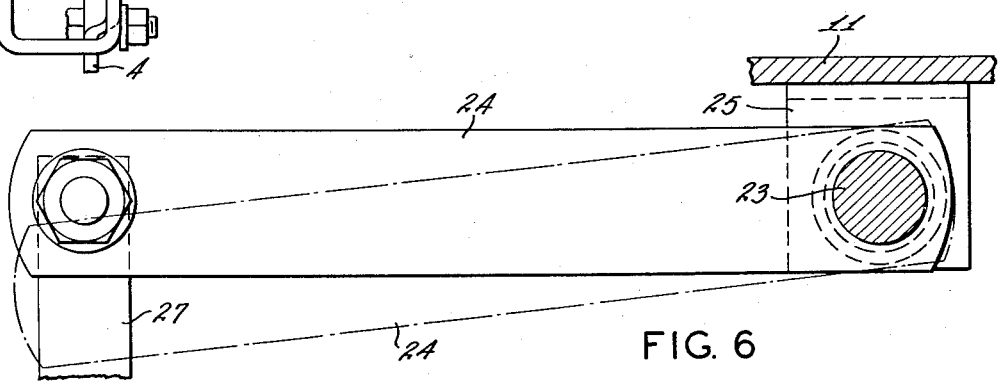
FIG. 6 is a cross section view taken on line VI—VI of FIG. 1.

Referring to FIG. 5 the lateral control mechanism is shown operated by the cam surface 21 of the control lever 1. Pivotal movement of the control lever 1 operates the adjustable pushrod 5 to rotate the bell crank 13 on its axis. The transverse movement of the lever 2 operates a cam 20 to rotate the lateral control mechanism and the lateral control mechanism on the shaft 23. The lateral movement of the lever 1 is permitted by the bearing 30 which includes bushing 31 in the opening 32 of the handle 2. The handle 2 is normally biased in the right hand direction by the spring 33 embracing the pin 34. The spring is positioned between the washer 35 which engages the pin 36 and the washer 37 on the facing 21 of the lever 1. Lever 1 is normally biased to an engaging position with the support portion 3.

Figure 4:
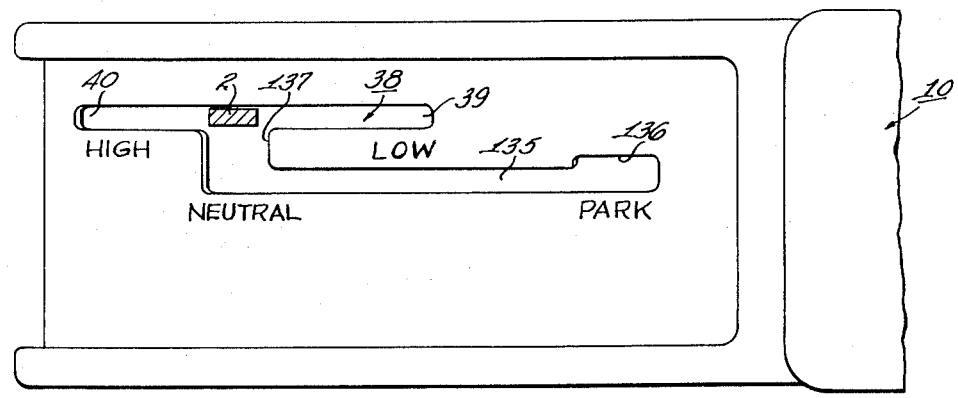
FIG. 4 is a view taken on line IV—IV of FIG. 1.
Figure 3:
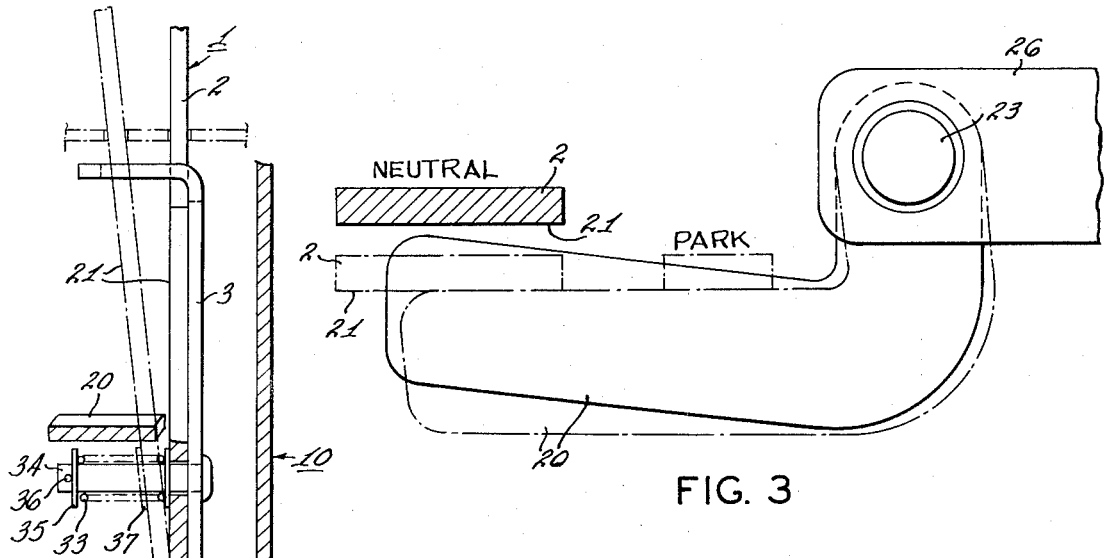
FIG. 3 is a cross section view taken on line III—III of FIG. 1.

Referring to FIG. 4 the slotted panel of the control console is illustrated. The slotted opening includes a park slot 135 which extends to form a notch 136. The notch 136 permits the lever 1 to partially lock within the slot to prevent accidental disengagement of the parking brake.

The park slot 135 extends forwardly to the transverse portion 137 of the slot which is connected to the shift range slot 38. The shift range slot has a low end 39 and a high end 40 for shifting of the control lever. The control lever 1 is normally biased in the right hand direction to engage the notch 136 when in the park slot or to slide into the shift slot 38.

Figure 7:
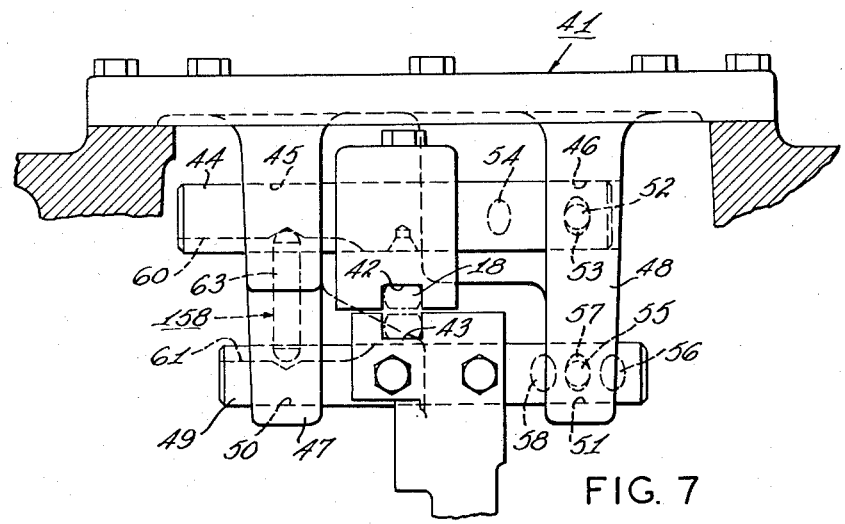
FIG. 7 is a view of the transmission showing the shift rails and the shift lever.
Figure 8:
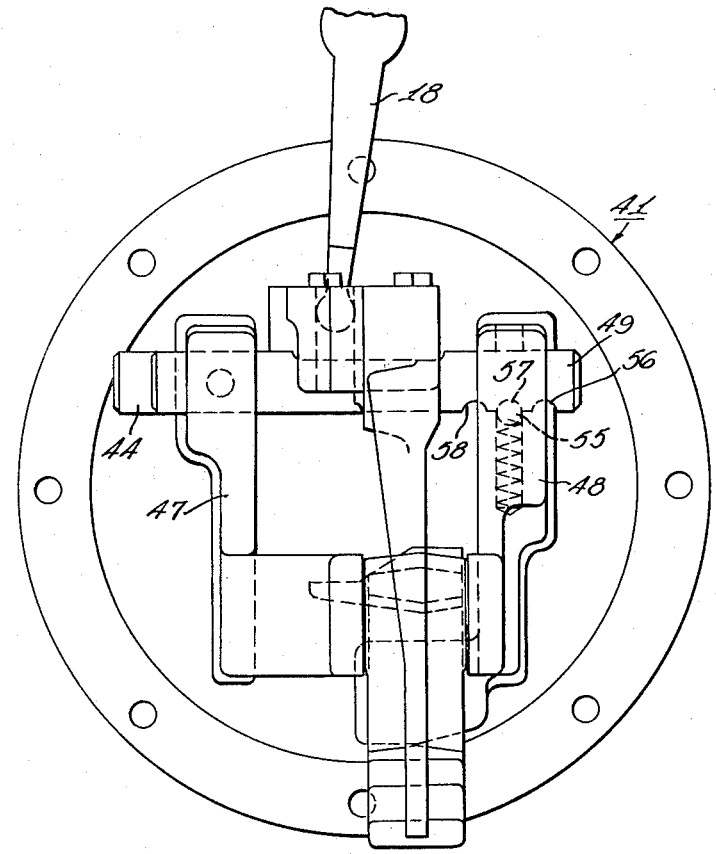
FIG. 8 is a view showing the shift lever on the transmission engaging one of the shift rails in the transmission.

Referring to FIGS. 7 and 8 the transmission housing 41 supports the vehicle transmission. The shift lever 18 is shown for selective positioning in the slot 42 or 43. The park lock shift rail 44 reciprocates through openings 45 and 46 in the partitions 47 and 48 respectively. The gear shift rail 49 also reciprocates through openings 50 and 51 in the partitions 47 and 48 respectively.

The park lock shift rail 44 reciprocally moves in the right hand direction and the detent 52 selectively engages the detent groove 53 or 54 depending on the position of the shift rail whether in neutral or the park position.

The shift rail 49 also engages the detent 55 which selectively seats in grooves 56, 57 or 58.

Intermediate the shift rail 49 and the park rail 44 is positioned an interlock 158. The interlock 158 is biased to a locking position with either of the rails due to the raised surface 60 or 61 which engages the interlock pin 63.

When the shift lever is moved to a shifting position, the shift rail 49 or park rail 44 is reciprocated by the lever. It is noted that the interlock pin seats in one or the other of the grooves when the other shift rail is reciprocated and this prevents more than one of the rails from moving at the same time.

The operation of this device will be described in the following paragraphs.

Referring to FIGS. 1 and 2 the control lever 1 is mounted in the console 10. Ideally the console is mounted on the side of the operator station to provide a roomy platform at the operator station for the operator of the vehicle. Since the shift lever 18 is normally in the center portion of the vehicle and located beneath the platform a control mechanism for shifting is required if the control lever 1 is to be positioned in the control console 10 on the side of the operator station.

It is noted in FIG. 4 that the control lever 1 has essentially four positions which include the park, neutral, low, and high position. When it is desired to shift from the park position the control lever 1 which includes the handle portion 2 is biased in the left hand direction releasing it from the notch 136. The lever can then be moved forwardly in the slot 35 to release the park lock from the drive shaft. As the shift lever is moved forwardly it can then be shifted into the neutral position and engage the gearshift rail and from there shifted to either the high or low position. As the shift lever is pivoted on its axis which is coincidental with the axis of the bolt 8 it moves forwardly causing the arm 4 to move downwardly. This in turn will pivot the bell crank 13.

It is noted however, before the control lever 1 is shifted it is moved in the right hand direction into the slot 38. When the lever is shifted into slot 38, the cam surface 21 of lever 1 operates against the arm 20 of the lateral control mechanism 22 which rotates on the center of shaft 23. This in turn operates actuator arm 24 to shift the pushrod 27 and pivot the shift lever 18 about axis 105 so that it engages the shift rail 49. When the shift rail 49 is engaged it then shifts the shift lever 18 by pivoting about axis 106 when the control lever 1 is pivoted on its axis. When it is rotated into the forward position it shifts into the high range as indicated on the slot 40. Continued forward movement of the shift lever then positions the shift lever 18 in the high gear range.

When the vehicle is to be shifted into the low range the lever 1 is moved rearwardly into the slot 39. In this position the arm 4 rotates upwardly pulling the link 5 and rotating the bell crank 13. This in turn will cause the link 17 to move the shift lever 18 forwardly and in turn shift the shift rail rearwardly. The shift rail moving rearwardly accordingly engages the low range of gears in the transmission and the vehicle then is operating in the low range.

Accordingly, when it is desired to disengage either the low or high speed gear ranges the shift lever is moved to the neutral position through the neutral slot 137 into the park slot 135. This in turn operates the lateral control mechanism 22 by rotating it on its axis as the surface 21 engages the arm 20 which rotates on the axis 20 of the shaft 23. This in turn shifts the shift lever to shift the link 27 in the left hand direction and positions the shift lever 1 in the park rail 44. When the shift lever is positioned in the slot of the park shift rail the shift lever 1 is then moved into the park slot 136 and the drive shaft of the vehicle is locked.

The embodiments of the invention in which an exclusive property or privilege is claimed are defined as follows:

1. A shift mechanism for a vehicle comprising, a control lever, means pivotally supporting said control lever for pivotal movement about an axis and means permitting movement transverse to said pivotal movement, a transmission shift lever including means pivotally supporting said shift lever for movement about at least two axes, a shift linkage connecting said control lever with said shift lever for pivotal movement of said shift lever about a first axis responsive to pivotal movement of said control lever, a lateral shift selector mechanism operatively connected between said control lever and said shift lever to selectively pivot said shift lever about a second axis responsive to transverse movement of said control lever.

2. A shift mechanism for a vehicle as set forth in claim 1 wherein said shift linkage includes a link and a bellcrank pivotally connecting said control lever with said shift lever to transfer pivotal movement of said control lever to said shift lever to pivot said shift lever about its first named axis.

3. A shift mechanism for a vehicle as set forth in claim 1, wherein said lateral shift selector mechanism includes a rotatably mounted shaft, an operator arm engaging said control lever and an actuator arm engaging said shift lever and integrally connected to said rotatably mounted shaft to thereby pivot said shift lever about its second axis.

4. A shift mechanism for a vehicle as set forth in claim 1, wherein said control lever includes a transversely movable portion, means normally biasing said transversely movable portion of said control lever transversely to its pivotal movement about its axis.

5. A shift mechanism for a vehicle as set forth in claim 1, including means defining a control panel pivotally supporting said control lever, said panel defining a slot permitting pivotal movement of said control lever, a notch in the end of said slot for reception of said control lever defining a park position, means normally biasing said control lever into said park slot.

6. A shift mechanism for a vehicle as set forth in claim 1 including, means defining an operator station on a vehicle, means defining a control panel on the side of said operator station for pivotally supporting said control lever.

7. A shift mechanism for a vehicle as set forth in claim 1, including a transmission housing pivotally supporting said shift lever, means supporting a platform on said transmission housing, a control panel pivotally supporting said control lever on the side of said platform, said shift linkage and said lateral shift selector mechanism thereby providing connection of said control lever on the side of said platform with said shift lever under said platform for shifting said shift lever.

8. A shift mechanism for a vehicle as set forth in claim 1 wherein the axis of said control lever defines a transverse axis relative to said vehicle, said shift lever defines a transverse and a longitudinal axis relative to said vehicle.

9. A shift mechanism for a vehicle as set forth in claim 1 wherein said control lever includes a lever support portion pivotally supporting said lever, a handle portion mounted on said support portion, means normally biasing said handle portion against said support portion to allow a movement transverse to said pivotal movement.

10. A shift mechanism for a vehicle as set forth in claim 1 including, a control panel pivotally supporting said control lever, said control panel defining a pair of parallel slots connected by a transverse slot, said slots adapted for permitting shifting of a first and a second shift rail by said shift lever.

* * * * *